(12) United States Patent
Clatt

(10) Patent No.: US 7,762,561 B2
(45) Date of Patent: Jul. 27, 2010

(54) DIVE CADDY

(75) Inventor: Gary B. Clatt, 1150 S. Colony Way #3 PMB #606, Palmer, AK (US) 99645

(73) Assignee: Gary B. Clatt, Palmer, AK (US)

( * ) Notice: Subject to any disclaimer, the term of this patent is extended or adjusted under 35 U.S.C. 154(b) by 0 days.

(21) Appl. No.: 11/643,258

(22) Filed: Dec. 20, 2006

(65) Prior Publication Data

US 2008/0150245 A1 Jun. 26, 2008

(51) Int. Cl.
*B62C 1/04* (2006.01)
(52) U.S. Cl. .............. 280/1.5; 280/47.131; 280/47.24; 280/47.26; 280/63
(58) Field of Classification Search .............. 280/1.5, 280/47.12, 47.131, 47.17, 47.2, 47.24, 47.26, 280/47.33, 63, 79.5, 79.6
See application file for complete search history.

(56) References Cited

U.S. PATENT DOCUMENTS

| | | | | |
|---|---|---|---|---|
| 1,408,400 A * | 2/1922 | Richards | ........... | 280/47.19 |
| 2,377,399 A * | 6/1945 | Brumfield | ........... | 280/47.27 |
| 3,301,570 A * | 1/1967 | Berman | ........... | 280/47.131 |
| 3,679,227 A * | 7/1972 | Rock | ........... | 280/47.24 |
| 4,029,328 A * | 6/1977 | Herterich et al. | ........... | 280/47.24 |
| 4,098,416 A * | 7/1978 | Fawley | ........... | 414/453 |
| 4,205,937 A * | 6/1980 | Fawley | ........... | 414/457 |
| 4,593,841 A * | 6/1986 | Lange | ........... | 224/153 |
| 4,625,949 A * | 12/1986 | Walker | ........... | 266/48 |
| 4,815,761 A * | 3/1989 | Henderson et al. | ........... | 280/47.3 |
| 4,865,346 A * | 9/1989 | Carlile | ........... | 280/654 |
| 5,035,269 A * | 7/1991 | Pytryga et al. | ........... | 141/1 |
| 5,071,148 A * | 12/1991 | Salvucci, Sr. | ........... | 280/47.24 |
| 5,095,736 A * | 3/1992 | Fesler et al. | ........... | 73/23.2 |
| 5,180,179 A * | 1/1993 | Salvucci | ........... | 280/47.315 |
| 5,292,140 A * | 3/1994 | Laing | ........... | 280/47.33 |
| 5,393,080 A * | 2/1995 | Ross | ........... | 280/47.26 |
| 5,431,422 A * | 7/1995 | Gamache | ........... | 280/47.19 |
| 5,492,346 A * | 2/1996 | Stadler et al. | ........... | 280/47.19 |
| D374,533 S * | 10/1996 | Read | ........... | D34/24 |
| 5,658,118 A * | 8/1997 | Luca | ........... | 414/444 |
| 6,047,983 A * | 4/2000 | Day, III | ........... | 280/652 |
| 6,116,623 A * | 9/2000 | Salvucci | ........... | 280/47.26 |
| 6,224,071 B1 * | 5/2001 | Dummer | ........... | 280/47.2 |
| 6,293,273 B1 * | 9/2001 | Byrne et al. | ........... | 126/41 R |
| 6,334,622 B1 * | 1/2002 | Romero | ........... | 280/47.26 |
| 6,341,789 B1 * | 1/2002 | Checa et al. | ........... | 280/47.28 |
| 6,413,032 B1 * | 7/2002 | Casper | ........... | 414/444 |
| 6,554,300 B1 * | 4/2003 | Ziolkowski | ........... | 280/47.27 |

(Continued)

*Primary Examiner*—Vaughn T Coolman
(74) *Attorney, Agent, or Firm*—Gary B. Clatt

(57) ABSTRACT

The Dive Caddy is a two wheeled land vehicle with it's primary purpose being to transport scuba diving equipment across tough terrain such as sandy beaches, rocky trails, and other hard to traverse, or reach scuba diving, or free diving locations. It is different than other prior carts in as that it has a breaking system for traveling down hills, And can be fitted with an auxiliary battery powered booster motor to traverse uphill, or help bring itself out of hard to exit situations, and also has a bench seat to stage a completed scuba unit for the diver to sit on while dawning his equipment. Another new feature of the Dive Caddy is that it has the ability to change tires for different types of terrain, be it sandy beaches, rocky hills, or mud, the Dive Caddy can adapt to them all.

20 Claims, 3 Drawing Sheets

U.S. PATENT DOCUMENTS

| | | | |
|---|---|---|---|
| 6,733,017 B2 * | 5/2004 | Intravatola | 280/79.6 |
| 6,799,769 B2 * | 10/2004 | Ziolkowski | 280/47.27 |
| 7,273,216 B1 * | 9/2007 | Hohrman | 280/79.5 |
| 7,316,413 B2 * | 1/2008 | Beaudoin | 280/653 |
| 7,347,429 B2 * | 3/2008 | Murillo | 280/47.17 |
| 2003/0235505 A1 * | 12/2003 | Brunelli | 417/234 |
| 2004/0050877 A1 * | 3/2004 | Ono | 222/399 |
| 2004/0104550 A1 * | 6/2004 | Do | 280/47.26 |
| 2004/0150175 A1 * | 8/2004 | Cepull | 280/47.24 |
| 2004/0255507 A1 * | 12/2004 | Belmont et al. | 43/107 |
| 2005/0236789 A1 * | 10/2005 | Knox et al. | 280/79.5 |
| 2006/0071435 A1 * | 4/2006 | Zwack | 280/47.27 |
| 2007/0290460 A1 * | 12/2007 | Girard et al. | 280/1.5 |

\* cited by examiner

DIVE CADDY

CROSS-REFERENCE TO RELATED APPLICATIONS

Not Applicable

BACKGROUND OF THE INVENTION

1. Field of the Invention

With the increase in popularity of scuba diving for sport, came an increase in need for devices to transport all of the equipment necessary for one or more divers to an increasing number of dive sites. Typically, divers are limited to areas where they can drive to, or load their gear on a boat with a lot of work involved in getting all their gear to the actual site, or the boat. Many possible great dive sites are overlooked due to the logistics of getting the equipment to the site easily, and staged for diving. The Dive Caddy facilitates the ability for divers to load their dive gear, even before leaving home, on the Dive Caddy, transporting the equipment close to the site, and once staged there, using the Dive Caddy to get the gear to whatever actual site the diver chooses to use.

2. Description of Related Art

There are several other carts on the market that are designed to help carry dive gear to diving sites. Many of them are listed below. Problems with existing carts are several. Most have very small tires that make it hard to pull the equipment over a sandy beach, or up and down rocky terrain and trails. Another problem is not having the efficiency and convenience of pre-loading the cart at home, and being able to secure it in your vehicle ready to use once you reach the site.

Related US Patents

U.S. Pat. No. 3,301,570 Berman 280/47.131
U.S. Pat. No. 6,341,789 B1 Checa 280/47.280
U.S. Pat. No. 6,047,983 Day III 280/652
U.S. Pat. No. 4,098,416 Fawley 414/453
U.S. Pat. No. 5,431,422 Gamache 280/47.190
U.S. Pat. No. D374,533 Read D34/24
U.S. Pat. No. 3,679,227 Rock 280/47.240

Another problem is the cumbersome activity of dawning your fully assembled scuba unit once you are on site. Even with a partner, it is easier to put on your dive gear if you have a stable platform to sit on.

BRIEF SUMMARY OF THE INVENTION

Although several other carts, and similar devices have been designed to assist in their effort, this cart adds several advantages that they don't.

The Dive Caddy is designed to travel easily over sandy areas, as some of the other carts do. It is also able to travel easily up and down trail systems well, as it is equipped with Mountain bike style tires, and a similar breaking system for slowing the loaded cart going down hills. One option for the Dive Caddy will be an optional battery powered electric motor to assist in getting out of muddy areas, or traveling uphill. It also will work very well at Motels, Hotels, Dive shops with great distances to the boat, and on Ferry Boat systems, such as the San Juan Islands in Washington State, all of which are places of great difficulty to reach for the sport diver.

An added feature of the Dive Caddy is the forward staging area where a diver is able to secure his or her assembled scuba unit, sit down on the provided seat, in front of the assembled unit, and don the unit. Under the bench seat is an adjustable leg that allows for changing the height of the seat for different sized divers. This makes donning your scuba unit much easier, and easier for your dive partner who will be assisting you.

Divers typically carry one or two duffel bags with gear which can be stored on the cargo net area behind the cylinder staging area, and over the tank storage area.

Another feature of the Dive Caddy is the loading handles which allow two people, one on each side of the cart, to pick it up fully loaded, and place it in the back of a pickup truck, or other vehicle, and ratchet tie it down for transportation to the dive site.

The Dive Caddy also has a small toolbox on board for maintenance and repair.

Also, The dive Caddy has a harness system for the operator to help disperse the load of the weighted cart, and assist with controlling it while traveling on rough terrain.

DETAILED DESCRIPTION OF THE INVENTION

Figure 1A:
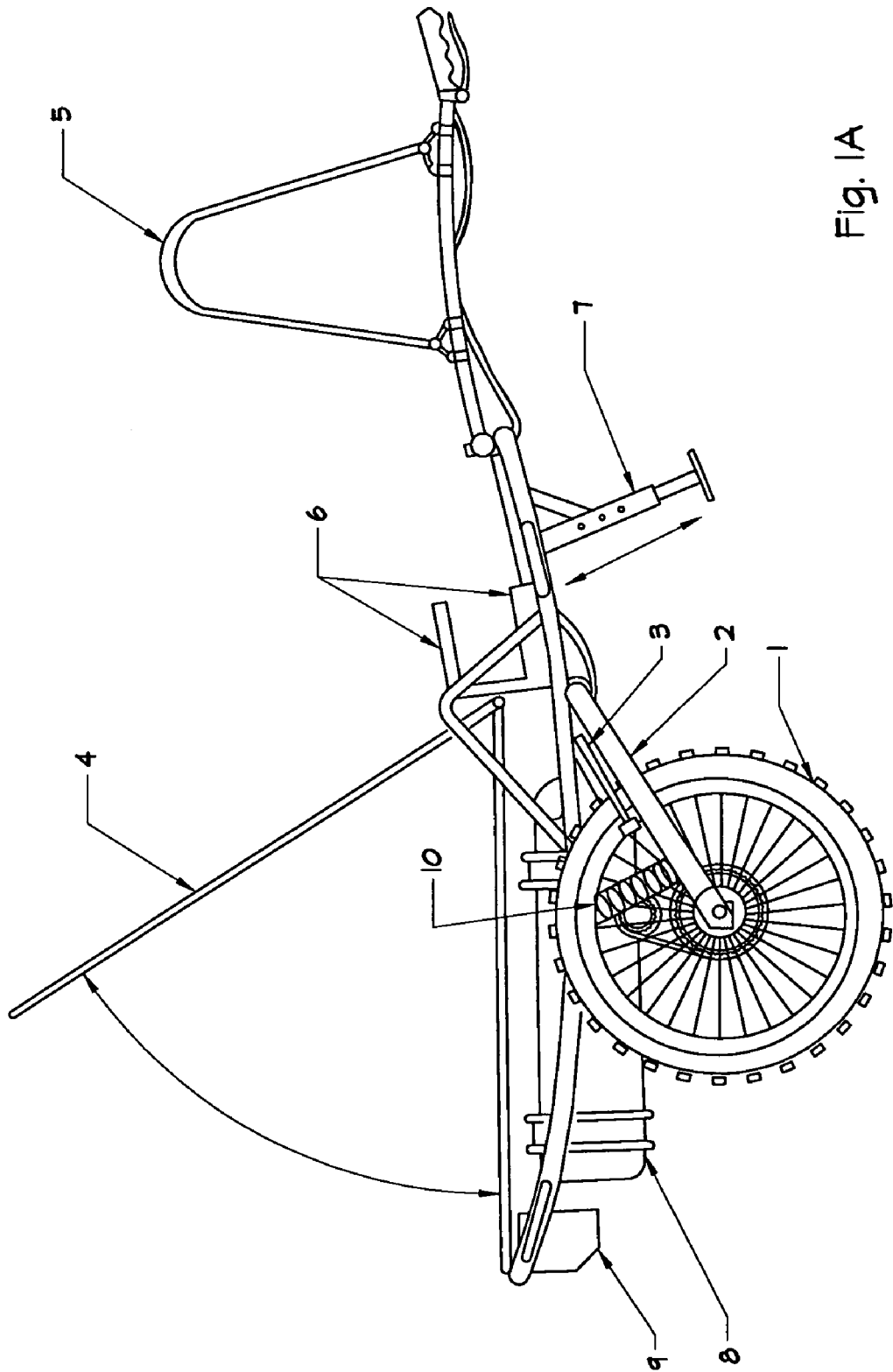
FIG. 1A is a side view of the cart depicting items 1-10
Figure 1B:
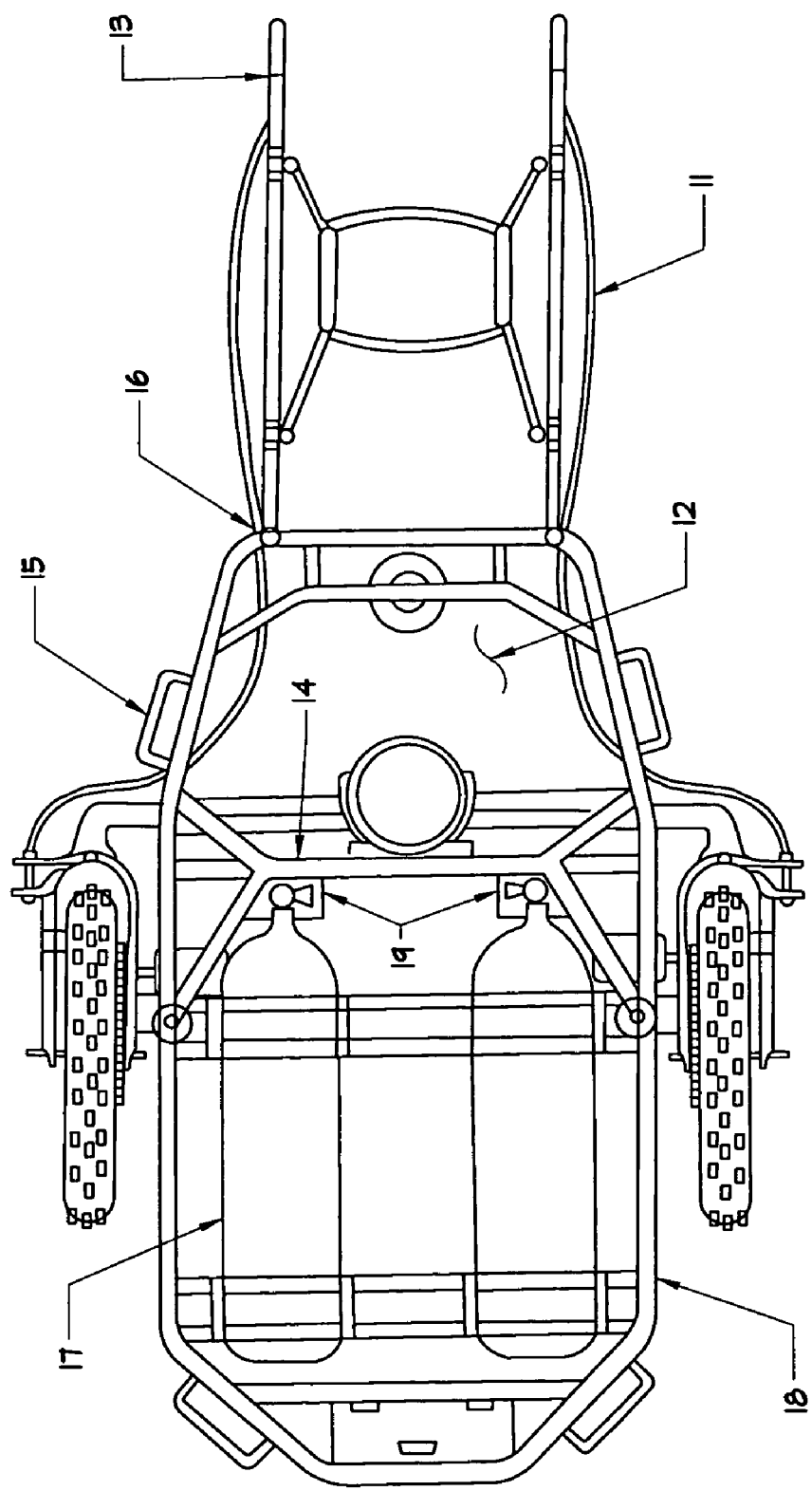
FIG. 1B is an overhead view of the cart depicting items 11-19
Figure 1C:
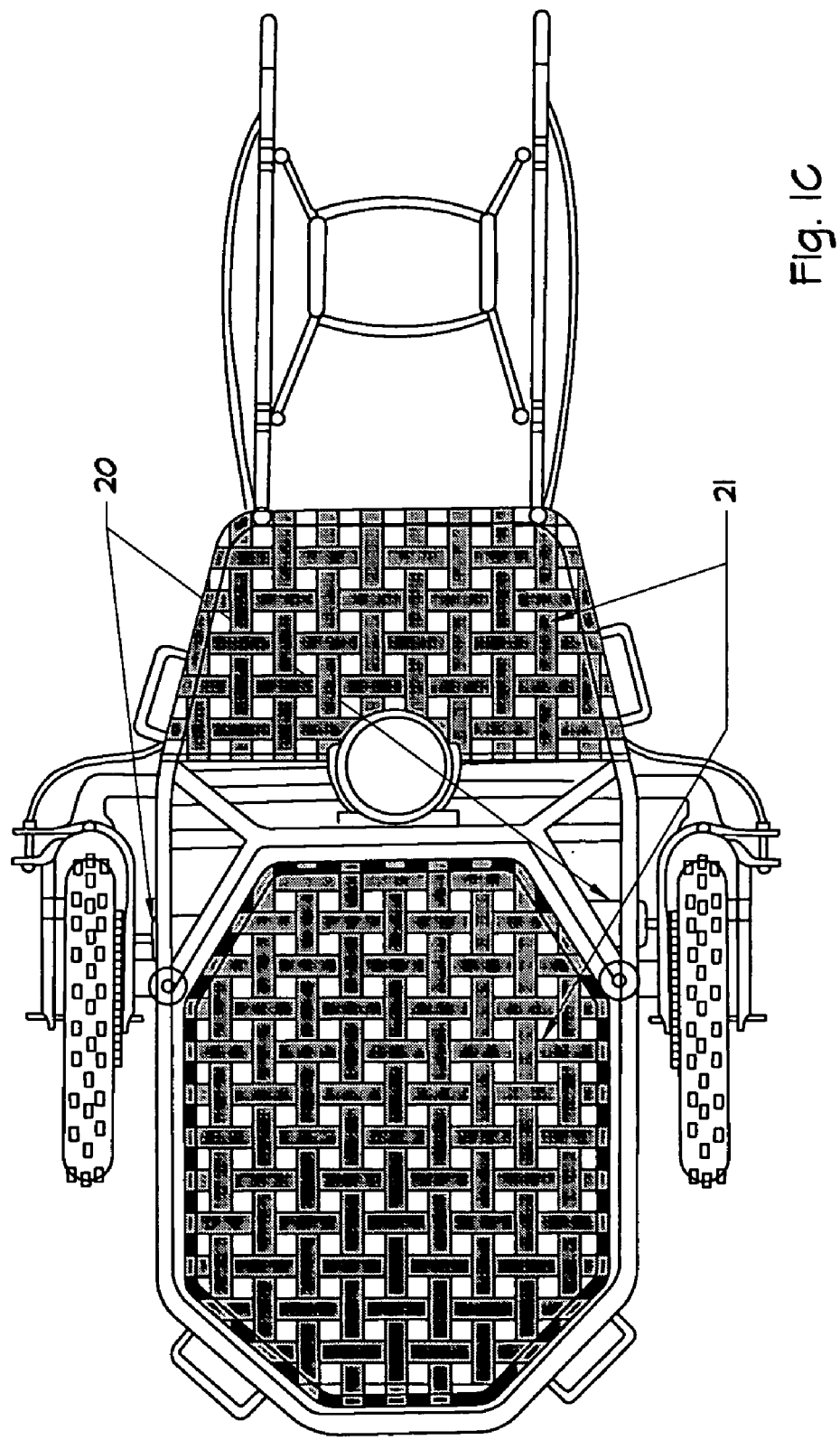

Two wheels are used as shown in Item 1, fitted with a rubber mountain bike type tire for rough terrain, a balloon type tire for sandy beach like applications, or any other type tire needed for any terrain encountered are used here. This wheel assembly is mounted on an axle of size and strength as to satisfy all structural, functional, and safety needs. This axle is attached to the wheel fork assembly.

As shown in Item 2, the wheels are attached to a wheel fork assembly, which can be made from standard mountain bike parts. The forks are attached to wheel on each side of the wheel just like on a bicycle, with nuts tightened on to the axle which is part of the wheel assembly. This wheel fork assembly is then attached to a u shaped cross member that pivots on the main frame of the cart. This is held in place by collars fixed to the cart allowing the two frames, main cart frame, and wheel fork frame, to be attached to each other, but still allowing the wheel fork frame assembly to rotate up and down being controlled by the shock absorption system. All framework is made from 1"½ metal tubing, or any other material suited for this application. All materials used to be corrosion resistant and meet necessary structural and safety requirements.

As shown in Item 3, the breaking system is attached to the wheel fork assembly in a similar fashion as would be on a mountain bike, or other bicycle. It operates in a similar fashion as well, and has a cable running to a lever on the handle bar assembly. Pulling this lever draws the two brake pads into the wheel causing friction and the slowing of the cart, and releasing the lever frees up the wheel. This is really nice for traversing down long inclines. The wheel shown in Item 1, the fork assembly shown in Item 2, and the breaking system shown in Item 3, are collectively called the wheel fork assembly.

As shown in Item 4, the cargo net frame, supported by hinges on the vertical brace frame, is the main support system for the cargo net, which carries gear and equipment over the cylinder storage area. The cargo net and frame are raised to allow dive tanks to be secured in the cylinder storage area under the cargo net frame, and then lowered and secured in place by a locking device. This is the normal mode for transporting gear. Once again, all framework is to be made from 1"½ tubular metal, or any other material suited for this application. All materials used to be corrosion resistant and meet necessary structural and safety requirements.

As shown in Item 5, the adjustable shoulder and body harness system is designed to take weight off of the operator's hands and arms, and redistribute that weight onto his or her shoulders and hips.

The harness is adjustable length and in width, and attaches to the handlebars with swivels for more maneuverability. The harness is made of nylon or other similar material for lightweight use and strength. The harness is used by unbuckling the chest strap on the front of the harness, sliding the left arm in under the left shoulder pad, and then sliding the right arm in under the opposite shoulder pad on the right side. Then securing the chest strap buckle.

As shown in Item 6, the scuba unit clamp and base assembly is used to hold in place the assemble scuba unit for the diver while donning. It is supported in place by the vertical bracing system Item 14, and the main cart frame assembly Item 18. It is used while the diver is sitting down on the staging area seat Item 12. The clamp assembly can be made from existing clamps available on the market. This area can also be used for additional storage when in transport mode.

As shown in Item 7, the forward strut assembly consists of an upper receiver tube, lower foot tube, and a forward brace. The upper receiver tube is fitted with holes that line up with the hole in the lower foot tube to allow it to be pinned at different lengths to adjust the height of the seat above where the diver sits to don his or her assembled scuba unit. This assembly is attached to the main frame Item 18, at the top of the receiver tube, and at the top of the forward brace. There is a foot on the bottom of the foot tube that distributes the forward weight of the cart to the ground evenly. This foot is fitted with a rubber shoe to prevent slipping and sliding. This assembly is also fabricated out of tubular steel.

As shown in Item 8, the cylinder storage holding brackets are attached to the main frame Item 18, by a tubular steel bracing system, and designed in two pieces consisting of an upper half circle, and a lower half circle. These two pieces are hinged on one side and secured with wing nuts or clamps on the other side. They swing up and open to allow the cylinder to be placed inside, seated on the rubber inner lining.

As shown in Item 9, the tool storage area is located at the rear of the cart and is attached to the main cart frame assembly Item 18. It is removable, and houses necessary tools for small repairs and maintance of the dive cart.

Item 10, shows the shock absorption system is attached to the wheel fork system Item 2, and the main cart frame assembly Item 18. It provides a smooth ride for transporting the scuba equipment over rough terrains. The complete shock absorption system is comprised of the shock absorber itself, a lower mounting bracket, an upper mounting bracket, and rubber pads with metal covers on both ends of the shock absorber fastened with nuts to the main cart frame assembly, and the wheel fork assembly, to provide shock absorption between the shock absorber itself, and the frame of the cart.

As shown in Item 11, the wheel break system operating cable is connected to the breaking system item 3, and the breaking lever, attached to the handlebar assembly Item 13. There is one cable running down each of the two handlebars to actuate each of the two breaking assemblies separately.

As shown in Item 12, the seat is positioned in a way so that while the cart is stationary, the diver can put his or her assembled scuba unit in the scuba unit clamp and base assembly, sit down on the Dive Caddy in front of the scuba unit, and put it on without having to have his or her partner help with donning the gear. This seat can be made from mold injected plastic, or nylon webbing.

As shown in Item 13, the handlebar assembly is connected to the main cart frame Item 18, by a locking swivel device Item 16, and hosts the break cable assembly Item 11, the break control levers, and the shoulder harness assembly. It also has rubberized handgrips to prevent slippage while carrying the cart. The handlebar assembly has the ability to rotate 180 degrees back to the main cart frame to allow ease of storage during transportation in a secondary vehicle.

As shown in Item 14, the vertical bracing system houses the hinges for the cargo net frame Item 4, the upper spring clamp assembly, and the tank staging base, allowing the scuba cylinder on the assembled scuba unit to be held vertically while being donned. This frame also adds structural support to the cart, while also defining between the forward scuba units donning area Item 6-Item 12, and the rear tank storage and cargo area Item 4-Item 17.

As shown in Item 15, the loading handles are welded to the sides of the main cart frame allowing for ease of loading into a secondary vehicle. One person gets on each side of the cart; a grab a forward and rear handle, and then lifts the loaded cart into a secondary vehicle. Then tie down straps are used to secure the cart into the vehicle.

As shown in Item 16, the locking swivel device is attached to the main cart frame Item 18, and the handlebar assembly Item 13. This device also has increments allowing it to be adjusted farther apart at the ends where the operator stands if more room is needed. The swivel rotates 180 degrees folding back the main cart frame for ease of storage while transporting, and also allowing more room for a second unit in the back of a pickup truck or other vehicle.

As shown in Item 17, the scuba cylinders are being stored under the cargo net area, and are held in place by the cylinder storage brackets Item 8, and the main cart frame item 18. A skid plate is also in place directly beneath the cylinder valves to protect them while in transportation mode. They are accessed by raising the cargo net frame Item 4, and retrieving the cylinders from the cylinder storage holding brackets.

As shown in item 18, the main cart frame assembly is made from 1½" tubular metal framing of a corrosion resistant, and structurally sufficient size and type. It shall also meet any and all safety requirements needed. The main cart frame carries the suspension arm for the wheel fork assembly Item 2, and also receives the upper bracket for the shock absorption system Item 10. It also houses the seat for the scuba unit donning area Item 12, and is attached to the vertical brace frame Item 6, which supports the scuba unit clamp and base assembly. The main cart frame also supports the cylinder storage holding brackets Item 8. In essence, the main cart frame is the support system for the entire Dive Caddy cart.

As shown in Item 19, these are the skid plates for the cylinder valve assemblies. They are attached to the wheel fork assembly arm, and are made from corrosion resistant plate steel. They may also be fitted with rubber padding to prevent unnecessary damage to cylinders while being transported.

The invention claimed is:

1. A cart comprised of a main frame made from a tubular corrosion resistant material that forms a basic rectangular shape having an inverted arch extending along each lateral side from the front to the rear of the cart such that the front and rear of the cart are located at a greater distance from the ground surface than the sides of the main frame when the cart is in use, wherein the cart comprises:

a wheel and fork assembly that supports the cart and provides means for rolling the cart across the ground surface;

a cylinder storage area;

a cargo storage area;

a retractable handlebar system;

a forward strut assembly; and an equipment donning area;

wherein the wheel and fork assembly comprises a wheel attached to a fork with an arm extending in a transverse direction of the cart from a top of the assembly under the cart to another wheel and fork assembly on the opposite side of the cart thereby creating a dual wheel system that is attached to a bottom surface of the main frame whereby the arm extends through a collar on each side of the main frame that allows the arm to swing up and down relative to the main frame while being damped by a shock absorption system.

2. The cart according to claim 1, further comprising a booster motor that is adapted to be attached to the wheel and fork assembly on a motor mounting bracket.

3. The cart according to claim 1, wherein the retractable handlebar system is made of a substantially similar material as the main frame and is arched in an upward fashion as opposed to the inverted arch of the main frame, said retractable handlebar system having the ability to fold back from a normal operating position to a storage and transport position, carrying a brake cable line for a twin pad friction brake, and supporting a shoulder harness system.

4. The cart of claim 1, wherein the cylinder storage area is located inside the main cart frame in a rear section of the cart and is comprised of a series of brackets attached to the main frame on the lateral sides, said brackets protruding towards the middle of the cart and holding four rubber-lined circular brackets in which the cylinders are housed, said cylinders having cylinder heads that are protected by a skid plate mounted to the cart underneath the cylinder valve heads.

5. The cart of claim 1, wherein the cargo storage area is located directly over the cylinder storage area in a rear section of the cart and comprises tubular corrosion resistant material substantially similar to the material of the main frame which follows the contours of the main frame in a complementary fashion around the inside of the main frame and slightly elevated from said main frame, wherein the cargo storage area is attached to a vertical bracing system having at least one hinge which allows the cargo storage area to be raised and lowered, thereby allowing access to the cylinder storage area.

6. The cart of claim 1, wherein the forward strut assembly comprises tubular corrosion resistant material substantially similar to the material of the main frame, said forward strut assembly further comprising two portions, an inner portion sliding up and down within an outer portion, wherein the outer portion is attached to the main frame and has several holes that allow the strut assembly to be adjusted in height by pinning one of the several holes in the outer portion to a single hole located in the inner portion that is aligned with said one of the several holes, and said outer portion is attached to a strut at a first end of the strut and the strut is attached to the main frame at a second end of the strut.

7. A cart comprised of a main frame made from a tubular corrosion resistant material that forms a basic rectangular shape having an inverted arch extending along each lateral side from the front to the rear of the cart such that the front and rear of the cart are located at a greater distance from the ground surface than the sides when the cart is in use, wherein the cart comprises:

a wheel and fork assembly that supports the cart and provides means for rolling the cart across the ground surface;

a cylinder storage area;

a cargo storage area;

a retractable handlebar system;

a forward strut assembly; and an equipment donning area;

wherein the equipment donning area comprises a vertical bracing system and a forward seating area, wherein the forward seating area is located directly in front of a vertical brace frame and directly behind the retractable handlebar system.

8. The cart of claim 7, wherein a twin pad friction brake system is attached to the wheel and fork assembly at a top portion of the fork and is activated by a lever mounted on the retractable handlebar system, said activation occurring via a brake line cable mounted to the main frame and said retractable handlebar system.

9. The cart of claim 7, further comprising a shock absorber having a first end and a second end, wherein the first end is mounted to the wheel and fork assembly above an axle of the wheel and the second end is attached to a bracket on the main frame, such that the shock absorber is positioned at a right angle to the wheel and fork assembly, and said shock absorber further being positioned such that the shock absorber is angled upwards and towards the rear of the cart as well as being angled upward and toward the middle of the cart.

10. The cart of claim 7, further comprising a spring clamp assembly, said spring clamp assembly comprising:

a base, said base being similar to a pipe cap and mounted to the main frame and a vertical brace frame;

a spring clamp, said spring clamp being mounted above the base on the vertical brace frame;

whereby the spring clamp assembly allows an operator to set a scuba cylinder in the base and push the scuba cylinder into the spring clamp thereby said spring clamp assembly holding the scuba cylinder.

11. The cart of claim 7, wherein the shoulder harness system comprises:

nylon webbing;

at least two shoulder pads; and a chest strap that aligns the shoulder harness system with the body of an operator, said shoulder harness system being attached to the retractable handlebar system utilizing swivels that allow freedom and range of motion.

12. The cart of claim 7, further comprising a booster motor that is adapted to be attached to the wheel and fork assembly on a motor mounting bracket.

13. A cart comprised of a main frame made from a tubular corrosion resistant material that forms a basic rectangular shape having an inverted arch extending along each lateral side from the front to the rear of the cart such that the front and rear of the cart are located at a greater distance from the ground surface than the sides when the cart is in use, wherein the cart comprises:

a wheel and fork assembly that supports the cart and provides means for rolling the cart across the ground surface;

a cylinder storage area;

a cargo storage area;

a retractable handlebar system;

a forward strut assembly;

an equipment donning area; and a vertical bracing system, wherein the vertical bracing system is made from a substantially similar material as the main frame and shaped in a fashion so as to be attached to the approximate longitudinal centers of each side of the main frame, bridge across from one side of the main frame to the other side of the main frame, have a diagonal support running from a top of a main vertical brace support rearwardly and down to each lateral side of the main frame, and wherein said main vertical brace support is positioned for mounting at least one cargo storage area frame hinge towards the rear and for mounting a spring clamp and base assembly towards the front of the cart.

14. The cart of claim 13, further comprising at least four loading handles, wherein at least two loading handles are located on each lateral side of the main frame, at least one loading handle on each lateral side being located at an aft portion of the main frame, and at least one loading handle on each lateral side being located at a forward portion of the main frame.

15. The cart of claim 14, wherein each of the loading handles comprises tubular corrosion resistant material substantially similar to the material of the main frame, said loading handles being shaped in an elongated "U" and fixed to the main frame thereby allowing two people to pick up the cart and load the cart into a secondary vehicle for transportation.

16. The cart of claim 13, further comprising a locking swivel device comprising a circular base plate, said circular base plate having holes therein and being mounted to a front portion of the main frame, thereby allowing said holes to accept a locking pin to be pushed down through an upper circular plate having complementary holes therein, said upper circular plate being attached to the retractable handlebar system in order to rotate said retractable handlebar system from an operating position to a storage and transportation position.

17. The cart of claim 13, further comprising a booster motor that is adapted to be attached to the wheel and fork assembly on a motor mounting bracket.

18. The cart of claim 13, wherein the wheel and fork assembly comprises a wheel attached to a fork with an arm extending in a transverse direction of the cart from a top of the assembly under the cart to another wheel and fork assembly on the opposite side of the cart thereby creating a dual wheel system that is attached to a bottom surface of the main frame whereby the arm extends through a collar on each side of the main frame that allows the arm to swing up and down relative to the main frame while being damped by a shock absorption system.

19. The cart of claim 13, further comprising a rear toolbox assembly, said rear toolbox assembly being made of metal or plastic, being mounted under the mainframe and centered in a rear portion of the cart, and being opened by a hinged lid at the top of the rear toolbox assembly.

20. The cart of claim 13, further comprising at least one skid plate attached to both the main frame and to a pair of cylinder storage brackets, said at least one skid plate being located underneath the cylinder heads to protect the cylinder valves while in transport.

* * * * *